US012450392B2

(12) United States Patent
Wehrle et al.

(10) Patent No.: US 12,450,392 B2
(45) Date of Patent: Oct. 21, 2025

(54) METHOD AND APPARATUS FOR THE ANONYMIZED IMAGE ACQUISITION IN AN INDUSTRIAL PLANT

(71) Applicant: SICK AG, Waldkirch (DE)

(72) Inventors: Klemens Wehrle, Endingen (DE); Thomas Kaltenbach, Gutach (DE)

(73) Assignee: SICK AG, Waldkirch (DE)

( * ) Notice: Subject to any disclaimer, the term of this patent is extended or adjusted under 35 U.S.C. 154(b) by 218 days.

(21) Appl. No.: 18/195,313

(22) Filed: May 9, 2023

(65) Prior Publication Data

US 2023/0367904 A1    Nov. 16, 2023

(30) Foreign Application Priority Data

May 11, 2022   (EP) .................................... 22172725

(51) Int. Cl.
  *G06F 21/62*   (2013.01)
  *G06F 21/60*   (2013.01)
(52) U.S. Cl.
  CPC ........ *G06F 21/6254* (2013.01); *G06F 21/602* (2013.01)
(58) Field of Classification Search
  CPC ... G06F 21/6254; G06F 21/602; G06V 20/52; G06V 40/10
  See application file for complete search history.

(56) References Cited

U.S. PATENT DOCUMENTS

| | | | |
|---|---|---|---|
| 9,934,447 B2 * | 4/2018 | Kant | G06V 20/52 |
| 10,089,508 B2 * | 10/2018 | Arce | G06K 19/06037 |
| 10,310,472 B2 * | 6/2019 | Matergia | G05B 19/0426 |
| 10,504,220 B2 * | 12/2019 | Lim | G06T 7/0008 |
| 10,846,573 B2 * | 11/2020 | Skinner | G06F 21/62 |
| 11,748,704 B1 * | 9/2023 | Groom | G06Q 30/018 705/28 |
| 11,816,241 B1 * | 11/2023 | Shintre | G06F 21/6209 |
| 2003/0108240 A1 * | 6/2003 | Gutta | G06T 5/70 382/282 |
| 2013/0001310 A1 * | 1/2013 | Miyazaki | G06K 7/10732 235/494 |
| 2015/0106628 A1 * | 4/2015 | Holman | G06F 21/6245 713/189 |

(Continued)

FOREIGN PATENT DOCUMENTS

| | | |
|---|---|---|
| DE | 10 2016 223 859 A1 | 5/2018 |
| EP | 3723049 A1 | 10/2020 |

(Continued)

OTHER PUBLICATIONS

Fomin et al.; "Selection of Neural Network Algorithms for the Semantic Analysis of Local Industrial Area", 2021, IEEE, pp. 380-385. (Year: 2021).*

(Continued)

*Primary Examiner* — Matthew Smithers
(74) *Attorney, Agent, or Firm* — Nath, Goldberg & Meyer; Jerald L. Meyer

(57) ABSTRACT

A method for the anonymized image acquisition in an industrial plant, comprising acquiring an image, wherein the image comprises an optoelectronically readable code and a personal feature; identifying the personal feature in the image; and obscuring the personal feature in the image.

12 Claims, 3 Drawing Sheets

(56) References Cited

U.S. PATENT DOCUMENTS

| | | | |
|---|---|---|---|
| 2015/0146925 A1* | 5/2015 | Son | G06V 10/235 |
| | | | 382/103 |
| 2015/0278535 A1* | 10/2015 | Holman | G06F 21/6209 |
| | | | 726/30 |
| 2015/0332463 A1* | 11/2015 | Galera | H04N 7/18 |
| | | | 382/103 |
| 2020/0151528 A1* | 5/2020 | Chen | G06K 19/06056 |
| 2020/0152312 A1* | 5/2020 | Connor | G06V 20/20 |
| 2020/0320665 A1* | 10/2020 | Eswara | G06T 7/90 |
| 2021/0157998 A1* | 5/2021 | Rodriguez | G06V 20/20 |
| 2021/0342967 A1* | 11/2021 | Popov | G06V 40/10 |
| 2021/0374970 A1* | 12/2021 | He | G06T 7/11 |
| 2021/0406589 A1* | 12/2021 | Yadav | G06T 7/11 |
| 2022/0116513 A1* | 4/2022 | Kellermann | G06T 5/77 |
| 2022/0129846 A1* | 4/2022 | Montgomery | H04N 1/32128 |
| 2022/0164557 A1* | 5/2022 | Rossetto | G06V 10/17 |
| 2022/0201253 A1* | 6/2022 | Lundberg | H04N 7/188 |
| 2022/0366083 A1* | 11/2022 | Parlak | H04L 63/0407 |
| 2022/0415476 A1* | 12/2022 | Connor | G06V 20/20 |
| 2023/0030779 A1* | 2/2023 | DeLuca | G06N 20/20 |
| 2023/0154212 A1* | 5/2023 | Zhang | G06T 7/70 |
| | | | 382/181 |
| 2023/0244892 A1* | 8/2023 | Zou | G06K 7/146 |
| | | | 382/100 |
| 2023/0298351 A1* | 9/2023 | Lee | F25D 29/00 |
| | | | 382/103 |
| 2023/0308769 A1* | 9/2023 | Xue | G06F 3/04883 |
| 2023/0351130 A1* | 11/2023 | Laudereau | G06K 7/1417 |

FOREIGN PATENT DOCUMENTS

| | | | | |
|---|---|---|---|---|
| GB | 2596037 A | | 12/2021 | |
| KR | 20210098509 | * | 8/2021 | G06F 18/00 |
| WO | 2021/243465 A1 | | 12/2021 | |

OTHER PUBLICATIONS

Hossayni et al.; "Data Anonymization for Maintenance Knowledge Sharing", 2021, IEEE, pp. 23-30 (Year: 2021).*
Office Action dated May 26, 2023 issued in corresponding European Application No. 22172725.8.
Search Report dated Oct. 25, 2022 issued in corresponding European Application No. 22172725.8.

* cited by examiner

METHOD AND APPARATUS FOR THE ANONYMIZED IMAGE ACQUISITION IN AN INDUSTRIAL PLANT

FIELD

The invention relates to a method and an apparatus for the anonymized image acquisition in an industrial plant, such as a goods storage plant, a goods transport plant, and/or a goods processing plant.

BACKGROUND

In industrial plants, methods and apparatus for image acquisition are frequently used to monitor and to control goods sequences or process sequences.

However, personal features are often also acquired in this process, which cannot be in compliance with data protection. The personal features furthermore require memory space and can make subsequent processing steps of the acquired images more complex if e.g. larger image files have to be processed.

SUMMARY

It is therefore an object of the present disclosure to provide an improved method and an improved apparatus for the anonymized image acquisition for industrial plants that in particular simplifies a subsequent storage and processing of the images.

This object is first satisfied by a method for the anonymized image acquisition in an industrial plant. In a first step of the method, an image is acquired, for example by means of an image acquisition unit, such as a camera or an image sensor, in particular a line camera or a matrix camera. The image acquisition unit is in particular a so-called presentation camera. In this respect, an image is acquired regularly, continuously, and/or in an occasion-related manner, for example by actuating a light barrier and/or an operating element in the industrial plant.

In this respect, the image comprises an optoelectronically readable code, such as a barcode, a QR code, or a semacode. The code is in this respect, for example, attached or applied to an object that is stored in the industrial plant, such as an article or a package.

The image further comprises at least one personal feature, such as a human hand that holds the object, in particular in front of the camera for purposes of acquiring the image. For example, the personal feature can also comprise a portion of a fingerprint. In this respect, the personal feature can also comprise clothing, in particular one or more sleeves, and/or jewelry, such as a ring or a watch. The personal feature is a feature that allows conclusions to be drawn about the person, in particular a feature by which the person can be identified, further in particular uniquely identified.

In a further step of the method, this personal feature is then identified in the image, for example by means of a processing unit, as will be described in detail later.

In a final step of the method, the previously identified personal feature is obscured in the image. In the present case, obscured in particular means obscured to the human eye, but can also include obscured to a processing unit. The obscuring is in particular irreversible, i.e. it cannot be reversed, neither by a human nor by a processing unit.

Due to the method for the anonymized image acquisition, it is possible to process images that are acquired in an industrial plant without considering data protection specifications since the personal features have been obscured and a subsequent conclusion about a person, for example during a further and/or subsequent processing for other purposes, is no longer possible.

The image acquired in this way can in particular also be made available to cooperation partners outside the company and/or cooperation partners not subject to data protection specifications.

It is of particular advantage that the images also include less information due to the obscured features and thus also require less memory space. The original images are in particular deleted and only the images comprising the removed or obscured features are stored. Accordingly, the further processing of the images requires less processing power and memory.

The images comprising the obscured personal features are preferably used to influence the control of the industrial plant. Thus, a predetermined action of the industrial plant by which e.g. a further processing of a workpiece or the like takes place can e.g. be triggered by means of the readable code.

The method can be further developed in that the identifying of the personal feature in the image comprises segmenting the personal feature in the image. In the present case, segmenting means dividing the image into associated elements and subsequently classifying these divisions or segments into individual classes, in particular predefined classes. In this respect, algorithms for feature extraction can also be used and an image pre-processing can take place. Due to the segmentation, a statement is made for certain identified regions, in particular whether they are personal features in this respect.

Known methods can be used for the segmentation, such as pixel-oriented methods, edge-oriented methods and/or region-oriented methods. Additionally or alternatively, model-based and/or texture-based methods can be used for the segmentation.

A particularly efficient solution is provided by this further development. It is in particular achieved that only the regions of the acquired image that relate to personal features are also processed, i.e. obscured.

The method can be further developed in that the identifying and/or the segmenting of the personal feature in the image takes/take place by means of a neural network.

A neural network, which can also be designated as a neural network and/or an artificial neural network, is a computer-based artificial intelligence. The identification or segmentation can in particular also take place by means of a neural network trained by a deep learning algorithm so that even new acquired images which the neural network did not process during the training can nevertheless be segmented.

The identifying or segmenting can in particular take place with the aid of a processing unit specifically provided for this purpose, such as microprocessing units having a high degree of parallelization or programmable logic components.

A particularly powerful solution is provided by this further development. Due to the neural network, a particularly reliable method of identifying or segmenting the personal feature is in particular achieved.

The method can be further developed in that the obscuring of the personal feature in the image comprises pixelating the personal feature in the image.

In the present case, pixelating means that the originally fine-pixel resolution of the personal feature is replaced by a much coarser resolution so that instead of individual part features of the personal feature being visible, only unrecognizable pixels in a coarse structure are used. This can take place by a suitable pixelation algorithm.

The method can be further developed in that the obscuring of the personal feature in the image comprises removing the personal feature in the image.

In the present case, removing means deleting the pixels that relate to the personal feature and/or replacing these pixels with monochrome pixels, such as white or black pixels.

The method can be further developed in that the method further comprises reading out the optoelectronically readable code.

A reading out of the optoelectronically readable code takes place by means of suitable readout algorithms. For example, the information that is present or encrypted in the optoelectronically readable code can be read out and/or evaluated. The result of the read-out code, for example a number or a serial number, such as a tracking number, or a further content of the code can then be stored together with a location and/or a point in time of the readout.

In this respect, the optoelectronically readable code can in particular also comprise information and/or instructions with respect to the object to which the optoelectronically readable code can be applied. The optoelectronic code can in particular comprise a future and/or a past storage location, delivery location, and/or output location. Alternatively or additionally, the optoelectronically readable code can comprise a reference to a content and/or a property of the object.

The information read out from the optoelectronically readable code can then cause action and/or inaction in the industrial plant. The information can in particular be taken into account in the industrial plant during future activities, for example a further processing, a further transport, or a further storage of the object. For example, based on the read-out information, a next location can be determined to which the object will be transported, in particular within the industrial plant.

The method can be further developed in that the method further comprises storing the image with the obscured personal feature.

The storage can in particular be stored together with the read-out code and a location and/or a point in time of the readout.

Due to this further development, it is possible to document a passing of a certain waypoint or a current storage location of the object. Objects processed or manufactured by the industrial plant can thus be tracked within the industrial plant.

The method can be further developed in that the storing of the image comprises a transmission to a remote memory unit.

In this respect, a remote memory unit is in particular a memory unit that is remote from the image acquisition unit and the industrial plant. The remote memory unit can in particular be a memory unit on which the image comprising the obscured personal feature is stored for verification purposes. In this respect, the remote memory unit can in particular be located in a different country than the image acquisition unit or the industrial plant.

The method can be further developed in that the method further comprises cropping the image to a part region comprising the optoelectronically readable code.

In the present case, cropping, which can also be designated as masking, means removing image contents that do not comprise the optoelectronically readable code. In this respect, the cropping can also take place as a cutting off of a part of the previously or also subsequently obscured personal feature.

The cropping can take place in a fixed manner, i.e. always by a certain cropping factor, and/or dynamically, for example based on an identification of the personal feature and/or of the optoelectronically readable code.

If the cropping takes place before the identifying or segmenting and/or before the obscuring, less processing power is required for the identifying or segmenting and/or for the obscuring since less image content has to be processed.

In this respect, the cropping can take place both before the transmission to the remote memory unit and after. Alternatively, the cropping can also take place without the image being transmitted to a remote memory unit. The memory space in the memory unit is hereby reduced, both locally and remotely.

Due to this further development, particularly little memory space and/or processing power is/are required.

The method can be further developed in that the method further comprises encrypting the acquired image; transmitting the acquired image to a remote processing unit; and decrypting the acquired image at the remote processing unit.

The encryption can in this respect take place via common encryption algorithms. For example, the acquired image can be transmitted to a remote processing unit by means of SFTP. Alternatively or additionally, the acquired image can, for example, be encrypted and decrypted using a symmetric or asymmetric encryption protocol.

The encryption can in particular take place directly after the acquisition of the image, in particular before an identification and/or an obscuring of the personal feature takes place, and the thus unprocessed image can be transmitted to a remote processing unit and can be decrypted there.

The remote processing unit can be a processing unit directly connected to the remote memory unit or a processing unit that is different or remote from the remote memory unit.

Due to this further development, it is prevented that anyone intercepts the acquired image comprising the personal features and can draw a conclusion about the person in an unauthorized manner.

The method can be further developed in that the identifying and/or the segmenting of the personal feature in the image takes/take place at the remote processing unit.

In particular, for this purpose, the remote processing unit can particularly be configured to perform the identifying or segmenting and can in particular also be adapted for the use of a suitable neural network that is in particular trained for this application. For this purpose, the remote processing unit can further in particular be adapted to meet specific data protection specifications, for example, through the location and/or a certification of the remote processing unit.

Due to this embodiment, it is possible that the obscuring can take place particularly in compliance with data protection and does not take place in the industrial plant.

The initially mentioned object is likewise satisfied by an apparatus for the anonymized image acquisition in an industrial plant. With respect to the further embodiments and their advantages, reference is made to the above statements on the method for the anonymized image acquisition in an industrial plant.

The apparatus for the anonymized image acquisition in an industrial plant is in particular configured to partly or completely perform embodiments of the previously described method for the anonymized image acquisition in an industrial plant.

BRIEF DESCRIPTION OF THE DRAWINGS

Embodiments of the method and the apparatus for the anonymized image acquisition in an industrial plant are now described in detail in connection with the following Figures, wherein.

DETAILED DESCRIPTION

Figure 1:
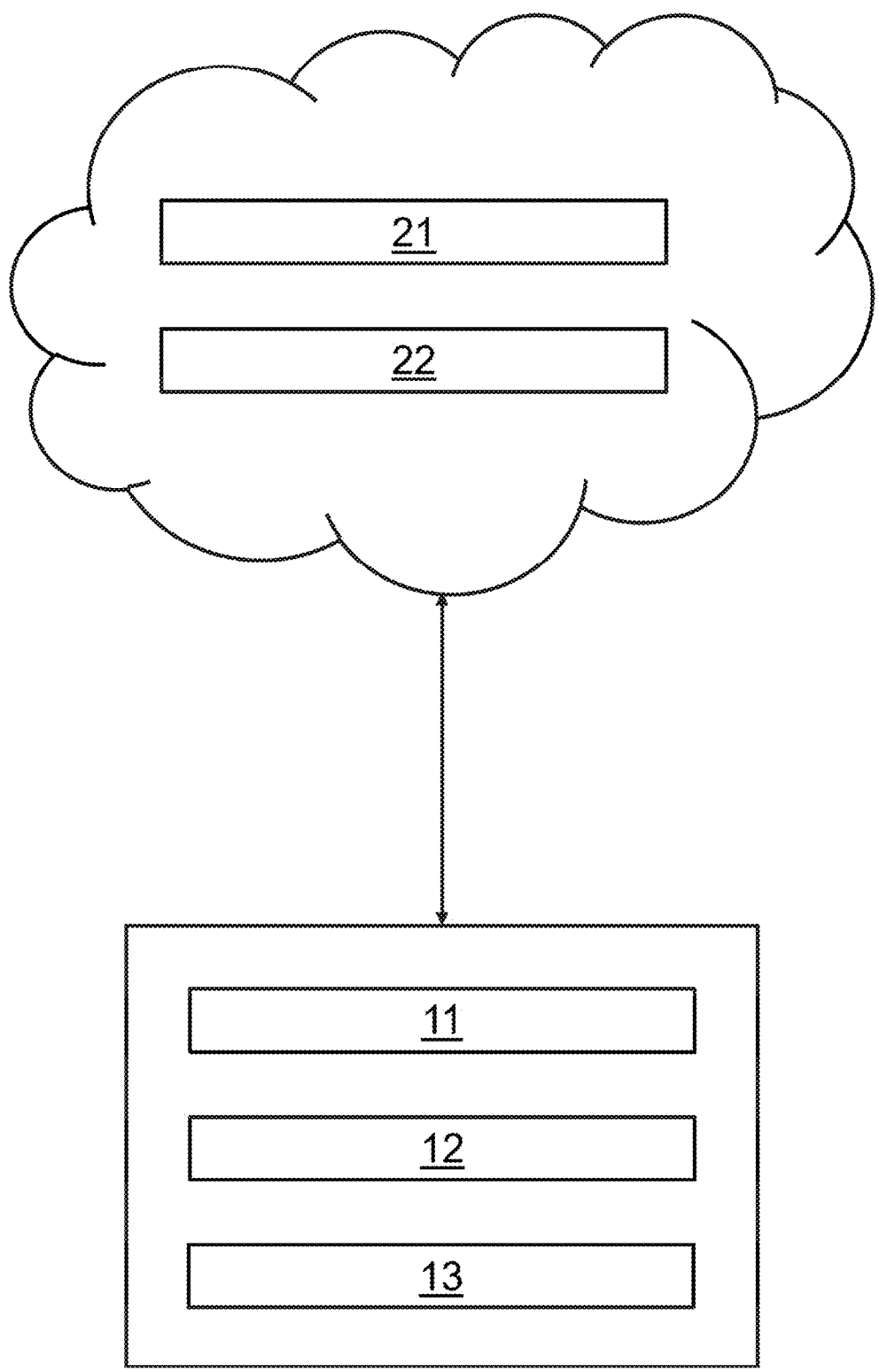
FIG. 1 shows a schematic view of an embodiment of an apparatus for the anonymized image acquisition in an industrial plant.

Identical reference numerals in this respect designate the same or similar features.

FIG. 1 shows a schematic view of an embodiment of an apparatus 1 for the anonymized image acquisition in an industrial plant.

In this respect, the apparatus 1 first comprises a local unit 10 and a unit 20 remote from the local unit 10. The remote unit 20 is in particular shown by way of example as a cloud service that can execute parts of the apparatus 1 or part steps of a method 100, also as described in connection with the following FIG. 2.

The local unit 10 comprises a local memory unit 11, a local processing unit 12, and an image acquisition unit 13. The local unit 10 additionally comprises a wireless and/or a wired communication unit that is not shown for reasons of clarity. In the present case, local means arranged in or at the industrial plant or a part of the industrial plant.

The remote unit 20 comprises a remote memory unit 21 and a remote processing unit 22. The remote unit 20 additionally comprises a wireless and/or wired communication unit that is not shown for reasons of clarity. In the present case, remote means arranged spatially spaced apart from the local unit 10 and in particular not arranged in the industrial plant.

The remote unit is in particular one or more servers that are set up at a remote location and that form a cloud service. In this respect, for reasons of clarity, the remote memory unit 21 and the remote processing unit 22 have been mapped as belonging to the same cloud service.

Alternatively, the memory unit 21 is provided by a first cloud service and the processing unit is provided by a second cloud service different therefrom, wherein the first cloud service and the second cloud service are connected via a wireless and/or a wired communication unit.

The remote unit 20 further in particular at least does not comprise an image acquisition unit or the local image acquisition unit 13, in addition to a communication unit, can be the only local unit that is arranged in the industrial plant.

The apparatus 1 is in particular configured to carry out the method described in the following in connection with FIG. 2.

Figure 2:
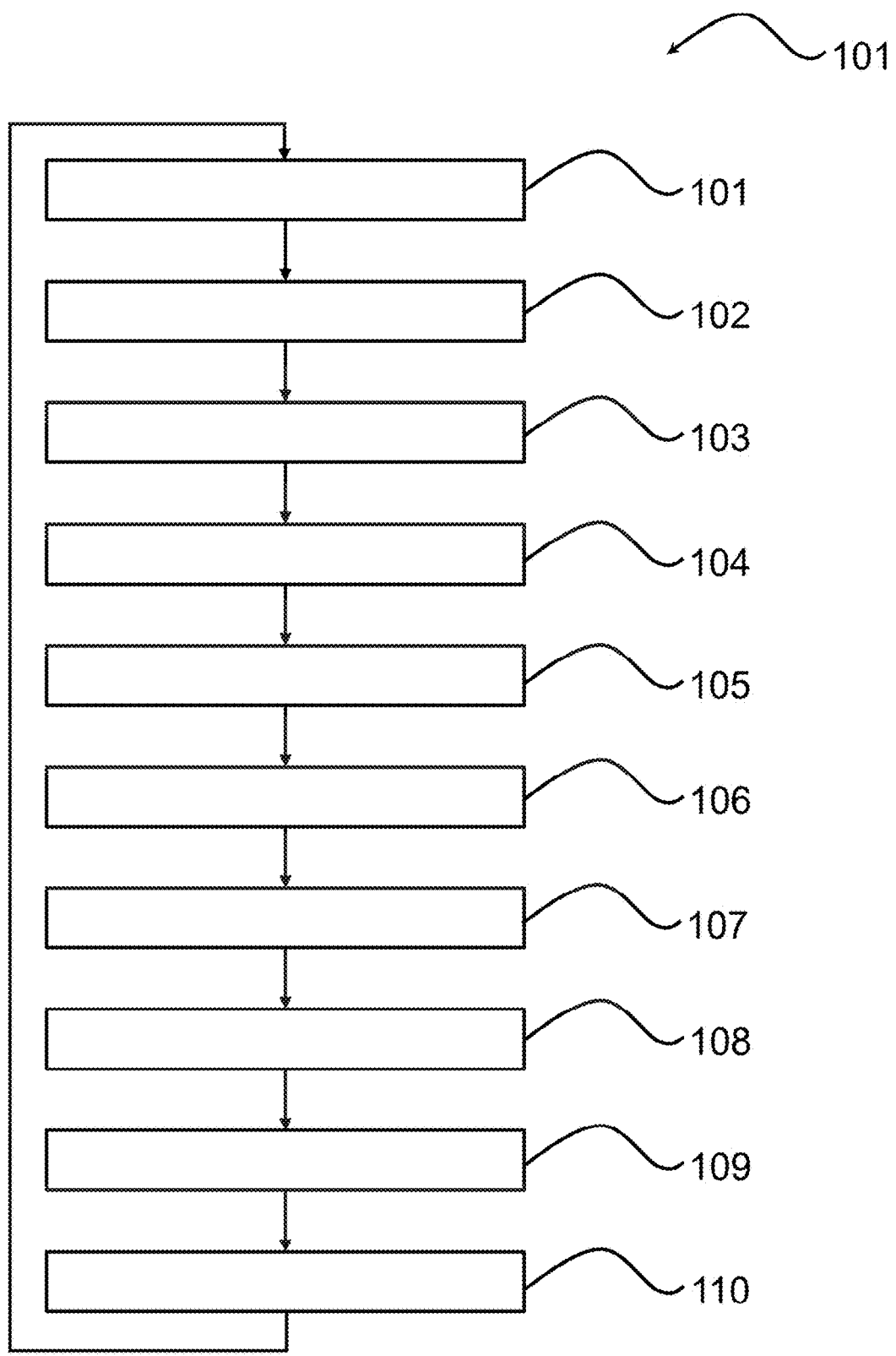
FIG. 2 shows a flowchart of an embodiment of a method for the anonymized image acquisition in an industrial plant.

FIG. 2 shows a flowchart of an embodiment of a method 100 for the anonymized image acquisition in an industrial plant.

In a first step 101 of the method 100, an image is acquired that comprises an optoelectronically readable code and a personal feature.

In a subsequent step 102, the acquired image is encrypted.

In a further step 103, the encrypted image is transmitted to a remote processing unit.

In a subsequent step 104, the encrypted image is decrypted at the remote processing unit.

In a further step 105, the personal feature in the decrypted image is identified by the remote processing unit by segmentation by means of a neural network.

In a subsequent step 106, the personal feature in the image is obscured by pixelating the personal feature in the image and/or by removing the personal feature from the image.

In a further step 107, the image is cropped to a part region comprising the optoelectronically readable code.

In a further step 108, the optoelectronically readable code is read out.

In a subsequent step 109, the image comprising the obscured personal feature is transmitted to a remote memory unit and is stored there in a final step 110. Subsequently, the method 100 can start again with the step 101.

Figure 3A:
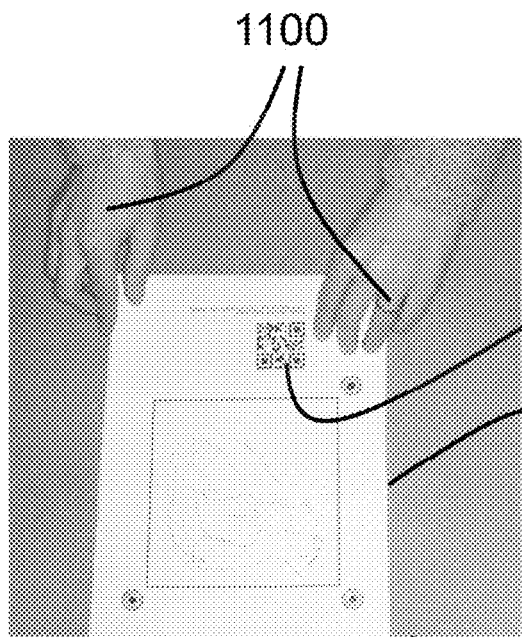
FIGS. 3a-d show individual steps of an applied method for the anonymized image acquisition in an industrial plant.

FIGS. 3a-d show a sequence of an applied method for the anonymized image acquisition in an industrial plant. In this respect, in a first step, an image 1000 is acquired that comprises both a personal feature 1100 and an optoelectronically readable code 1200, as shown in FIG. 3a.

In the example shown, the personal feature 1100 consist of two hands, wherein a part of the garment, namely the sleeve, and a ring are also shown that form the personal feature 1100 by way of example.

The optoelectronically readable code 1200 is configured as a QR code in the present case and is applied to an object 1300 that is here shown by way of example as a rectangular sheet of paper.

The image 1000 shown in FIG. 3a describes the image that is described in connection with FIG. 2 and that acquired in the first method step 101, in the manner in which this particular takes place when presenting the object 1300 with the aid of the hands of a person in front of a presentation camera.

In a further step, the personal feature 1100 is then identified in the image 1000, and indeed by means of a segmentation algorithm executed by a neural network, as has been described in connection with the method step 105 shown in FIG. 2.

Figure 3B:
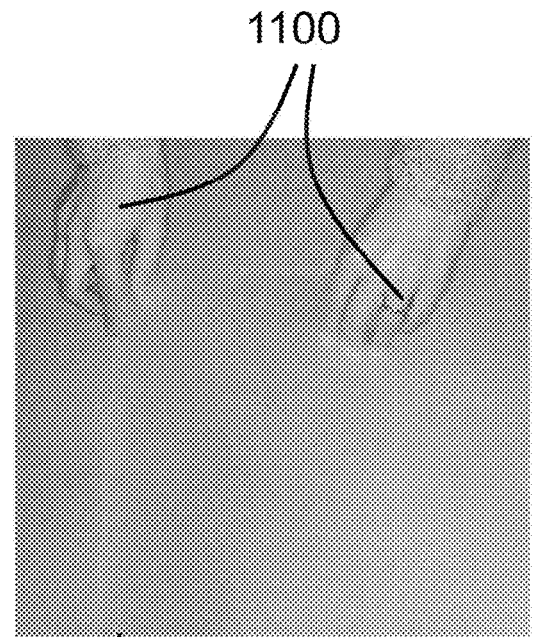

The result of this step 105 is shown in FIG. 3b in which only the personal feature 1100 is included in the image 1000. However, this is depicted in this manner solely for the purpose of understanding the identifying or segmenting. In fact, the object 1300 comprising the optoelectronically readable code 1200 is also still included in the image 1000 or the image shown in FIG. 3b does not represent all of the present image information, but rather only the result of the identification or segmentation.

Figure 3C:
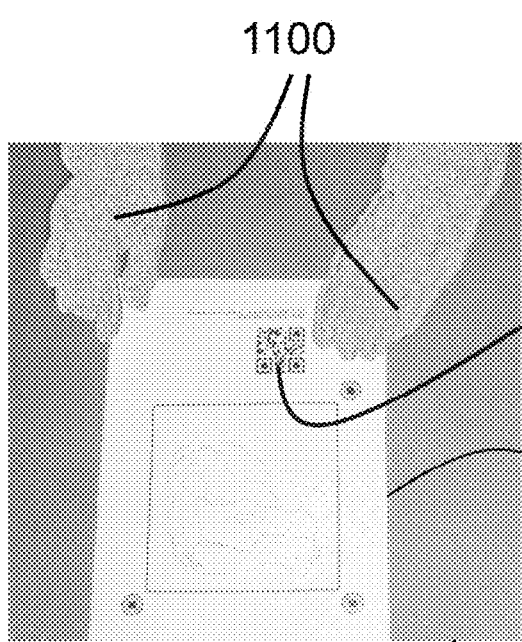
Figure 3D:
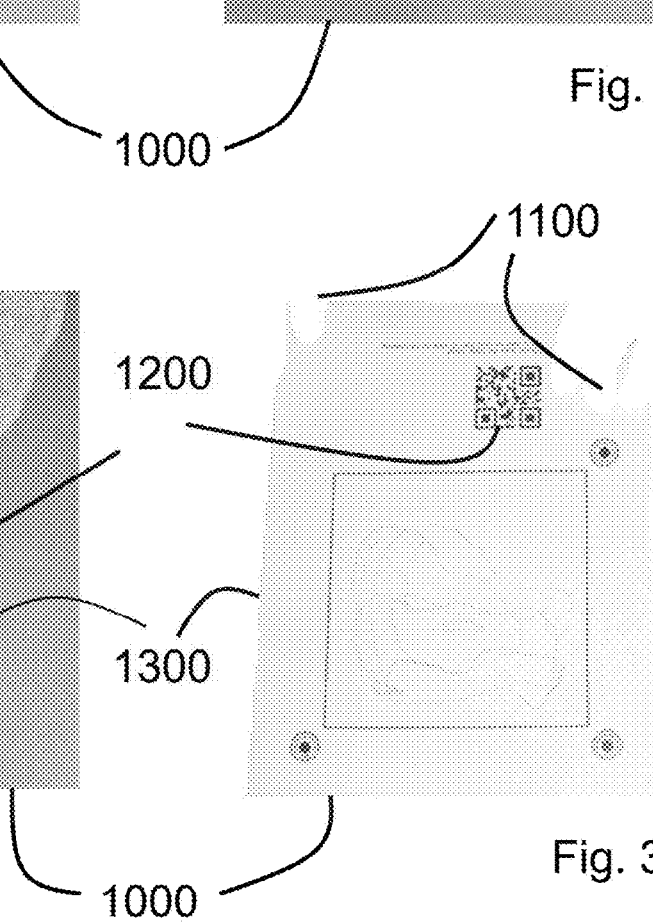

In a further step, the personal feature 1100 included in the image 1000 is then obscured. This is shown in FIG. 3c with a pixelation of the personal feature 1300. Alternatively, a removal or deletion of the personal feature 1100 is illustrated in FIG. 3d. This obscuring corresponds to the method step 106 described in connection with FIG. 2.

Furthermore, in the image 1000 shown in FIG. 3d, the image section has been cropped such that further information that is not necessary for the reading out of the optoelectronic code 1200, such as the bottom layer and also parts of the personal feature, have been removed so that the image 1000, as shown in FIG. 3d, only comprises a part region of the image 1000 on which the optoelectronically readable code 1200 is mapped. This image 1000 shown in FIG. 3*d* corresponds to the image generated in connection with the method step 107 described in FIG. 2.

Efficient solutions that result in a lower memory load and a lower processing load are made possible by the previously described embodiments, wherein the embodiments simultaneously contribute to a processing in compliance with data protection of objects by persons in an industrial plant, such as a goods storage plant, a goods transport plant, and/or a goods processing plant.

REFERENCE NUMERAL LIST

1 apparatus
10 local unit
11 local memory unit
12 local processing unit
13 image acquisition unit
20 remote unit
21 remote memory unit
22 remote processing unit
100 method
101 method step
102 method step
103 method step
104 method step
105 method step
106 method step
107 method step
108 method step
109 method step
110 method step
1000 acquired image
1100 personal feature
1200 optoelectronically readable code
1300 object

The invention claimed is:

1. A method for the anonymized image acquisition in an industrial plant, comprising the steps:
   acquiring an image of a part of an industrial plant, wherein the image comprises an optoelectronically readable code and a personal feature;
   identifying the personal feature in the image;
   obscuring the personal feature in the image; and
   storing or transmitting the image with the obscured personal feature or reading out the optoelectronically readable code.

2. The method in accordance with the preceding claim 1, wherein the identifying comprises segmenting the personal feature in the image.

3. The method in accordance with claim 2, wherein the identifying and/or the segmenting takes/take place by means of a neural network.

4. The method in accordance with claim 1, wherein the obscuring comprises pixelating the personal feature in the image.

5. The method in accordance with claim 1, wherein the obscuring comprises removing the personal feature from the image.

6. The method in accordance with claim 1, further comprising the step:
   reading out the optoelectronically readable code.

7. The method in accordance with claim 1, further comprising the step:
   storing the image with the obscured personal feature.

8. The method in accordance with claim 7, wherein the storing of the image comprises a transmission to a remote memory unit.

9. The method in accordance with claim 1, further comprising the step:
   cropping the image to a part region comprising the optoelectronically readable code.

10. The method in accordance with claim 1, further comprising the steps:
    encrypting the acquired image;
    transmitting the acquired image to a remote processing unit; and
    decrypting the acquired image at the remote processing unit.

11. The method in accordance with claim 10, wherein the identifying and/or the segmenting takes/take place at the remote processing unit.

12. An apparatus for the anonymized image acquisition in an industrial plant, comprising:
    an image acquisition unit that is configured to acquire an image of a part of an industrial plant, wherein the image comprises an optoelectronically readable code and a personal feature;
    a memory unit that is configured to store the acquired image;
    a processing unit that is configured to identify the personal feature in the image and to obscure the personal feature in the image; and
    an output unit storing or transmitting the image with the obscured personal feature or reading out the optoelectronically readable code.

* * * * *